United States Patent [19]

Kuo

[11] Patent Number: 5,393,840

[45] Date of Patent: * Feb. 28, 1995

[54] THERMOSETTING COATING COMPOSITIONS

[75] Inventor: Thauming Kuo, Kingsport, Tenn.

[73] Assignee: Eastman Chemical Company, Kingsport, Tenn.

[*] Notice: The portion of the term of this patent subsequent to Sep. 14, 2010 has been disclaimed.

[21] Appl. No.: 143,702

[22] Filed: Nov. 1, 1993

[51] Int. Cl.⁶ ..................... C08L 33/14; C08L 67/02
[52] U.S. Cl. ................................. 525/159; 525/162
[58] Field of Search .......................... 525/162, 159

[56] References Cited

U.S. PATENT DOCUMENTS

| | | | |
|---|---|---|---|
| 2,993,873 | 7/1961 | Heinrich et al. | 260/22 |
| 3,836,491 | 9/1974 | Taft et al. | 260/22 |
| 4,076,766 | 2/1978 | Simms | 260/850 |
| 4,189,421 | 2/1980 | Shay et al. | 260/38 |
| 4,267,239 | 5/1981 | Thankachan | 428/425.1 |
| 4,298,658 | 11/1981 | Thankachan | 428/425.1 |
| 4,322,508 | 3/1982 | Peng et al. | 525/110 |
| 4,331,782 | 5/1982 | Linden | 525/173 |
| 4,338,379 | 7/1982 | Strolle et al. | 428/520 |
| 4,343,839 | 8/1982 | Blegen | 427/340 |
| 4,397,989 | 8/1983 | Adosko | 525/162 |
| 4,716,200 | 12/1987 | Berghoff | 525/111 |
| 4,751,267 | 6/1988 | Berghoff | 525/108 |
| 5,043,192 | 8/1991 | Jones et al. | 428/1 |
| 5,239,018 | 8/1993 | Yezrielev et al. | 525/418 |
| 5,245,002 | 9/1993 | Kuo | 528/176 |
| 5,256,756 | 10/1993 | Kuo | 528/176 |
| 5,256,757 | 10/1993 | Kuo | 528/176 |
| 5,256,758 | 10/1993 | Kuo | 528/176 |

FOREIGN PATENT DOCUMENTS

| | | |
|---|---|---|
| 50-040629 | 4/1975 | Japan. |
| 51-044130 | 4/1976 | Japan. |
| 51-056839 | 5/1976 | Japan. |
| 52-073929 | 6/1977 | Japan. |

*Primary Examiner*—Patricia A. Short
*Attorney, Agent, or Firm*—Bernard J. Graves, Jr.; Harry J. Gwinnell

[57] ABSTRACT

This invention is directed to thermosetting coating compositions comprising blends of phenol-functional polyesters and hydroxyl-functional acrylic copolymers. The resin blends are formulated with an amino crosslinker to form industrial baking enamels. Coatings thus obtained exhibit improved acid-etch resistance over those based on hydroxyl-functional acrylic resins and have a good combination of hardness and impact resistance. These coatings are particularly useful as automotive coatings.

37 Claims, No Drawings

THERMOSETTING COATING COMPOSITIONS

FIELD OF THE INVENTION

This invention relates to thermosetting coating compositions. In particular, it relates to compositions comprised of a phenolic-functional polyester resin, an acrylic resin, and an amino type crosslinking agent.

BACKGROUND OF THE INVENTION

There is a need in the coatings industry for high strength, high modulus, chemically-resistant coatings. For high modulus, the coatings must exhibit exceptional hardness, while for high strength, they must have good resistance to impact. As to chemical resistance, it is particularly desirable for automotive coatings to have excellent acid-etch resistance. This invention is directed toward the above objective. Crosslinkable polyester coatings resins are synthesized and formulated into industrial baking enamels from which surface coatings can be obtained, the cured films exhibiting a unique combination of hardness (pencil hardness >4H) and impact resistance (160 lb-in) as well as exceptionally high acid-etch resistance.

It has been demonstrated that thermotropic liquid crystal polymers (LCPs) possess many advantages over conventional thermoplastics. The self-reinforcement of the ordered polymeric molecules in the liquid crystalline (LC) state generally yield thermoplastics with exceptionally high strength and high modulus. In addition, LCPs have also been shown to have excellent solvent resistance, chemical resistance (e.g., acid, base, detergent), and weatherability. As described above, these properties are highly desirable in surface coatings. Recently, coating scientists have attempted to apply the LCP technology to the coatings art.

U.S. Pat. No. 5,043,192 (Jones) discloses the application of liquid crystalline polyesters to coatings which display high hardness and high impact resistance. In one of the examples, linear oligoester diols were prepared and modified with p-hydroxybenzoic acid (PHBA) to yield LC oligoesters. The PHBA diol mole ratio varied from 2.1/1 to 13/1. It was suggested that the excess of PHBA formed repeating p-oxybenzoyl LC segments in the oligoester chain ends. The resulting resins, however, were highly colored (i.e., brownish). The use of large quantities of the expensive raw material, PHBA, also made the resins commercially impractical.

European Patent Application No. 419088 discloses non liquid crystalline esterphenol-capped liquid polymer and polyol compositions in combination with an amino crosslinking agent which provided films having superior properties. The resins were prepared by following a procedure similar to that of Jones at a lower reaction temperature (i.e., <200° C.) A PHB\aliphatic hydroxyl equivalent ratio of 1/1 was used mostly, although it was suggested the ratio could be ranged from about 0.05 to about 1.25. This reference teaches that the coatings showed improved hardness and impact resistance.

Curable resin compositions modified with hydroxybenzoic acid had also been reported by others. U.S. Pat. No. 2,993,873 disclosed that drying times and coating properties of oil-modified alkyd resins could be improved by replacing part of unsaturated fatty acids with hydroxybenzoic acid in the resin formulations. The coatings were cured by air dry or baking without the presence of a crosslinking agent. U.S. Pat. Nos. 4,267,239 and 4,298,658 describe the modification of alkyd resins with PHBA. The resulting resins could be rapidly cured at ambient temperatures with isocyanates in the presence of a tertiary amine vapor. U.S. Pat. Nos. 4,343,839 and 3,836,491 disclose a coating composition which is rapidly curable at room temperature in the presence of a tertiary amine catalyst vapor. The coating compositions comprised phenolic terminated polyesters and multi-isocyanate curing agents. U.S. Pat. No. 4,331,782 discloses the improved synthesis of a phenol-functional polyester polymer which utilizes a preformed adduct of a hydroxybenzoic acid and an epoxy compound. Japanese Patents No. 75 40,629, 76 56,839, 76 44,130, and 77 73,929 disclose powder coating compositions containing phenolic hydroxy end groups. These resins had high softening points and were applied to the surface as powders.

In an effort to raise the softening point of the melamine type crosslinking agent for powder coatings, U.S. Pat. No. 4,189,421 taught the synthesis of solid addition products having a softening point above 100° F. by the reaction of a monohydroxy, single-ring aromatic compound and a hexakis(alkoxymethyl)amino-triazine ring (e.g., hexamethoxymethylmelamine, HMMM). They found the phenol compound not only could react with HMMM to form ether linkages (O-alkylation), but it could also form methylene bridges at the phenol ortho- or para- position (C-alkylation). The extent of both reactions was essentially equal. Further ring closure of the resulting product could also have occurred.

Polyester and acrylic resins are the two most common polymers used for coatings binders. They are synthesized by different types of polymerization mechanisms, and their chemical structures are basically different. While the ester linkages of polyesters lead to flexible coatings having good impact resistance, they are also prone to hydrolysis which results in poorer enamel stability and coating weatherability. On the other hand, the carbon-carbon bonds formed in acrylic backbones provide coatings with good weatherability, but they also attribute to the coating's brittleness, i.e., poor impact resistance.

These two types of resins may be used according to the desired properties of various coating applications. Nevertheless, it is often desired to have coatings having good impact resistance as well as weatherability, such as those used in automotive finishes. As a result, it is of interest to the coating industry to try to combine and take advantage of these two technologies. There are many examples of resin or solution blends of polyester and acrylic resins in coating formulations. The blends can be formulated with a crosslinker to form thermosetting coatings which lead to an interpenetrating network of polyester and acrylic when cured. In the present invention, phenol-functional (PF) polyesters are utilized to blend with hydroxyl-functional acrylics to form thermosetting coatings which exhibit significantly improved properties.

The phenol-functional polyester resins utilized in this invention are described in copending application Ser. Nos. 07/883,079; 07/883,509; 07/954,992; and 07/954,993, incorporated herein by reference. Coating compositions comprising blends of polyesters and acrylics are the subject of the following U.S. Pat. No.: 4,076,766; 4,322,508; 4,338,379; 4,397,989; 4,751,267; and 4,716,200.

SUMMARY OF THE INVENTION

This invention provides thermosetting (i.e., crosslinkable) coating compositions which comprise a phenol-functional polyester, a hydroxyl-functional acrylic, and an amino type crosslinker. These compositions can be formulated into industrial baking enamels. Coatings thus obtained exhibit improved acid-etch resistance over those based on hydroxyl-functional acrylic resins and have a good combination of hardness and impact resistance. These coatings are particularly useful as automotive coatings.

DETAILED DESCRIPTION OF THE INVENTION

As noted in U.S. Pat. No. 5,245,002, coatings prepared from phenol-functional (PF) polyesters exhibit excellent acid-etch resistance and a unique combination of hardness and flexibility. However, it is known that polyester coatings in general have poorer outdoor weatherability than acrylic coatings. It would thus be desirable to improve the weatherability of the coatings based on PF polyesters. I have found that this can be achieved by blending the PF polyesters with a hydroxyl-functional acrylic resin. Thus, in one embodiment of the present invention, there is provided a thermosetting coating composition comprising (T) about 5 to about 81 weight percent of a curable polyester having a number average molecular weight of about 800 to about 3500 and a weight average molecular weight of about 3000 to about 70,000, comprising
  (a) about 35 to 45 mole percent of diol residues,
  (b) about 4 to about 8 mole percent of triol residues,
  (c) about 5 to about 18 mole percent of residues of an aliphatic diacid,
  (d) about 0 to about 30 mole percent of an aromatic dicarboxylic acid residue other than terephthalic acid,
  (e) about 5 to about 35 mole percent of terephthalic acid residues, and
  (f) about 12 to about 20 mole percent of aromatic hydroxy acid residues,
wherein all the stated mole percentages are based on the total moles of (a), (b), (c), (d), (e), and (f), with the total being 100 percent; and wherein substantilly all of said aromatic hydroxy acid residues are located at the ends of the polymer chains to which they are attached;
(II) about 5 to about 81 weight percent of an acrylic copolymer of ethylenically unsaturated monomers comprising at least one hydroxyl-functional monomer, said acrylic copolymer having a number average molecular weight of about 800 to about 10,000 and a weight average molecular weight of about 2,000 to 50,000; and
(III) about 10 to about 50 weight percent of an amino crosslinker.

It should be appreciated that in all of the compositions herein the mole and weight percentages will always total 100 percent In another embodiment of this invention, there is provided a thermosetting coating composition comprising (I) about 5 to about 81 weight percent of a curable polyester having a number average molecular weight of about 1500 to about 3500 and a weight average molecular weight of about 10,000 to about 70,000, comprising
  (a) about 20 to 36 mole percent of diol residues,
  (b) about 10 to about 21 mole percent of triol residues,
  (c) about 5 to about 18 mole percent of residues of an aliphatic diacid,
  (d) about 25 to about 35 mole percent of aromatic dicarboxylic acid residues,
  (e) about 12 to about 20 mole percent of aromatic hydroxy acid residues,
wherein all the stated mole percentages are based on the total mole of (a), (b), (c), (d), and (e), with the total being 100 percent; and wherein substantilly all of said aromatic hydroxy acid residues are located at the ends of the polymer chains to which they are attached;
(II) about 5 to about 81 weight percent of an acrylic copolymer of ethylenically unsaturated monomers comprising at least one hydroxyl-functional monomer, said acrylic copolymer having a number average molecular weight of about 800 to about 10,000 and a weight average molecular weight of about 2,000 to 50,000; and
(III) about 10 to about 50 weight percent of an amino crosslinker.

In a further embodiment of this invention, there is provided a thermosetting coating composition comprising (I) about 5 to about 81 weight percent of a curable polyester having a number average molecular weight of about 800 to about 3000 and a weight average molecular weight of about 3,000 to about 40,000, comprising
  (a) about 35 to 45 mole percent of diol residues,
  (b) about 4 to about 8 mole percent of triol residues,
  (c) about 0 to about 16 mole percent of residues of a linear aliphatic diacid,
  (d) about 24 to about 40 mole percent of 1,3-and/or 1,4-cyclohexanedicarboxylic acid residues,
  (e) about 12 to about 20 mole percent of aromatic hydroxy acid residues,
wherein all the stated mole percentages are based on the total mole of (a), (b), (c), (d), and (e), with the total being 100 percent; and wherein substantilly all of said aromatic hydroxy acid residues are located at the ends of the polymer chains to which they are attached;
(II) about 5 to about 81 weight percent of an acrylic copolymer of ethylenically unsaturated monomers comprising at least one hydroxyl-functional monomer, said acrylic copolymer having a number average molecular weight of about 800 to about 10,000 and a weight average molecular weight of about 2,000 to 50,000; and
(III) about 10 to about 50 weight percent of an amino crosslinker.

In another embodiment of this invention, there is provided a thermosetting coating composition comprising (I) about 5 to about 81 weight percent of a curable polyester having a number average molecular weight of about 1500 to about 3000 and a weight average molecular weight of about 5,000 to about 40,000, comprising
  (a) about 20 to 36 mole percent of diol residues,
  (b) about 10 to about 21 mole percent of triol residues,
  (c) about 0 to about 16 mole percent of residues of a linear aliphatic diacid,
  (d) about 24 to about 40 mole percent of cyclohexanedicarboxylic acid residues, (e) about 12 to about 20 mole percent of aromatic hydroxy acid residues, wherein all the stated mole percentages are based on the total mole of (a), (b), (c), (d), and (e), with the total being 100 percent; and wherein substantilly all of said aromatic hydroxy acid residues are located at the ends of the polymer chains to which they are attached;

(II) about 5 to about 81 weight percent of an acrylic copolymer of ethylenically unsaturated monomers comprising at least one hydroxyl-functional monomer, said acrylic copolymer having a number average molecular weight of about 800 to about 10,000 and a weight average molecular weight of about 2,000 to 50,000; and (III) about 10 to about 50 weight percent of an amino crosslinker.

As used herein, the term "aromatic hydroxy acid" preferably refers to a compound selected from the group consisting of

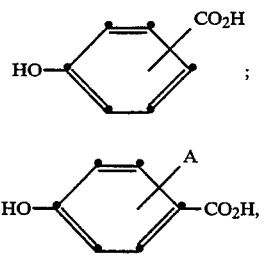

Wherein a is halogen, $C_1$-$C_6$ alkyl, or phenyl;

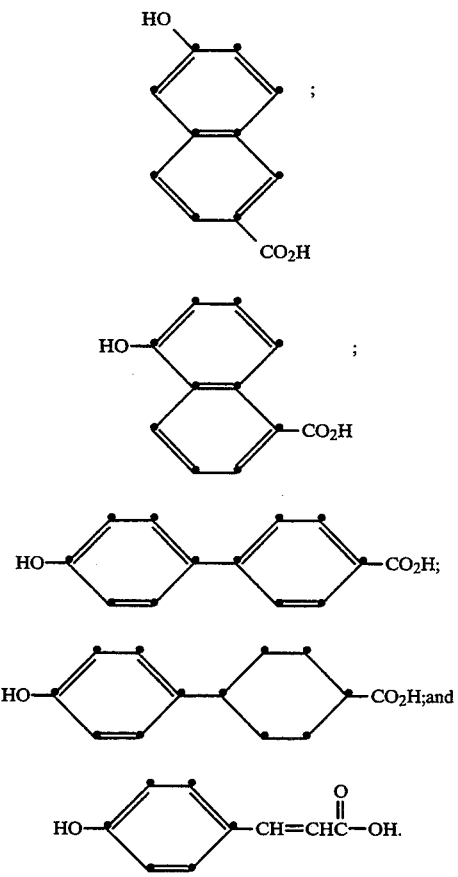

In this regard, the most highly preferred aromatic hydroxy acid is p-hydroxybenzoic acid.

The preferred weight percent of (I) is about 17 to 60, (II) is about 17 to 60, and (III) is about 20 to 30; most preferred weight percent of (I) is about 40 to 60, (II) is about 20–40, and (III) is about 20.

The preparation of the various phenol-functional polyesters of component (I) have been disclosed in U.S. Ser. Nos. 883,079; 883,509; 954,992; and 954,993, incorporated herein by reference. In the curable polyesters described herein, preferred diols are chosen from ethylene glycol; propylene glycol; 1,3-propanediol; 2,4-dimethyl-2-ethyl-hexane- 1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,3-pentanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; diethylene glycol, triethylene glycol; tetraethylene glycol; and pentaethylene, hexaethylene, heptaethylene, octa-ethylene, nonaethylene, and decaethylene glycols. The most highly preferred diol is 2,2-dimethyl-1,3-propanediol.

Preferred triols include trimethylolpropane, trimethylolethane, glycerol, and the like. Trimethylol-propane is the most highly preferred triol.

Preferably the aliphatic and aromatic dicarboxylic acid residues of the curable polyesters are selected from residues of oxalic; malonic, dimethylmalonic; succinic; glutaric; adipic; trimethyladipic; pimelic, 2,2-dimethylglutaric; azelaic; sebacic; fumaric; maleic; itaconic; phthalic; terephthalic; isophthalic; 2,5-norbornanedicarboxylic; 1,4-naphthalic; diphenic; 4,4'-oxydibenzoic, diglycolic; thiodipropionic; 4,4'-oxydibenzoic, diglycolic; thiodipropionic; 4,4'-sulfonyldibenzoic; 4,4'-biphenyldicarboxylic, and 2,6-naphthalenedicarboxylic acids.

The curable polyesters provided herein preferably have an acid number of not greater than 80 and a hydroxyl number of at least 10.

Suitable ethylenically unsaturated monomers for synthesizing the acrylic copolymer of component (II) include acrylate, methacrylate, styrene, (meth) acrylic acid, and vinyl esters; they may further contain hydroxyl, epoxy, carboxyl, blocked phenol, or acetoxyacetyl functional groups. The preferred hydroxyl number Of the acrylic copolymer of (II) is about 50–120 mg KOH/g.

The acrylic copolymer can be prepared by free radical polymerization in bulk or in a solvent. The initiators employed are the free radical type and are usually organic peroxides or azo compounds, such as benzoyl peroxide, t-butyl hydroperoxide, t-butyl peroxide, t-butyl peroxybenzoate, azobisisobutyronitrile, and 2,2'-azobis(2,4-dimethyl)-valeronitrile. The reaction is preferably carried out at the reflux temperature of the solvent used, which is generally higher than the thermal decomposition temperature of the initiator employed.

In a typical process for the preparation of the enamels, the polyester and acrylic resin solutions (e.g. 70% solids) are blended together, followed by the addition and mixing of an amino crosslinker, additional organic solvents, and an acid catalyst. An enamel with 40–70% non-volatiles is preferred. The enamel may further comprise additives and/or pigments commonly used in coating formulations.

Suitable solvents for the thermosetting coating composition include xylenes, cyclohexanone, ketones, (for example, methyl amyl ketone), 2-butoxyethanol, ethyl-3-ethoxypropionate, toluene, n-butanol, and other volatile inert solvents typically used in industrial baking (i.e., thermosetting) enamels.

The "amino cross-linking agent" is preferably a melamine-type cross-linking agent, i.e., a cross-linking agent having a plurality of —N(CH$_2$OR$^3$) functional groups, wherein R$^3$ is C$_1$–C$_4$ alkyl, preferably methyl.

In general, the cross-linking agent may be selected from compounds of the following formulae, wherein R$^3$ is independently C$_1$–C$_4$ alkyl:

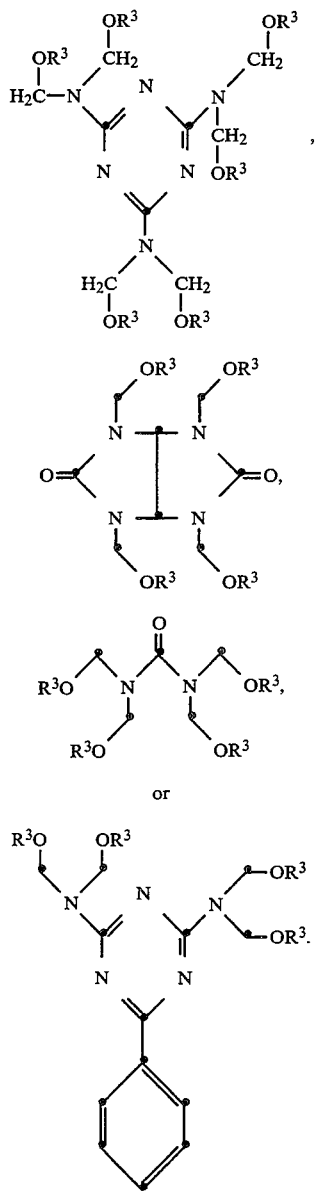

In this regard, preferred cross-linking agents include hexamethoxymethylmelamine, tetramethoxymethylbenzoguanamine, tetramethoxymethylurea, mixed butoxy/methoxy substituted melamines, and the like. The most preferred cross-linking agent is hexamethoxymethylmelamine. As a further aspect of the present invention, there is provided the thermosetting coating compositions above, further comprising one or more cross-linking catalysts. Examples of cross-linking catalysts for melamine type cross-linking agents include p-toluenesulfonic acid and NACURE ™ 155, 5076, 1051, and 5225 catalysts sold by King Industries and BYK-Catalysts (BYK-Chemie USA).

As a further aspect of the present invention there is provided the thermosetting coating compositions as described above, further comprising one or more leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewicides; corrosion inhibitors; thickening agents; or coalescing agents.

Specific examples of such additives can be found in *Raw Materials Index*, published by the National Paint & Coatings Association, 1500 Rhode Island Avenue, N.W., Wash., D.C. 20005.

Examples of flatting agents include synthetic silica, available from the Davison Chemical Division of W. R. Grace & Company under the trademark SYLOID ®; polypropylene, available from Hercules Inc., under the trademark HERCOFLAT ®; synthetic silicate, available from J. M. Huber Corporation under the trademark ZEOLEX ®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxy-ethyl)-N-oxtadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all available from BYK Chemie U.S.A. under the trademark ANTI TERRA ®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the tradename Brubreak of Buckman Laboratories Inc., under the BYK ® trademark of BYK Chemie, U.S.A., under the FOAMASTER ® and NOPCO ® trademarks of Henkel Corp./Coating Chemicals, under the DREWPLUS ® trademark of the Drew Industrial Division of Ashland Chemical Company, under the TROYSOL ® and TROYKYD ® trademarks of Troy Chemical Corporation, and under the SAG ® trademark of Union Carbide Corporation.

Examples of fungicides, mildewcides, and biocides include 4,4-dimethyloxazolidine, 3,4,4-trimethyloxazolidine, midified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the trademark CYASORB UV, and available from Ciba Geigy under the trademark TINUVIN, and diethyl-3-acetyl-4-hydroxy-benzyl-phonsphonate, 4-dodecyloxy-2-hydroxy benzophenone, and resorcinol monobenzoate.

Such paint or coating additives as described above form a relatively minor proportion of the enamel composition, preferably about 0.05 weight % to about 5.00 weight %.

As a further aspect of the present invention, there is provided a curable enamel composition optionally containing one or more of the above-described additives, further comprising one or more pigments.

Pigments suitable for use in the enamel compositions envisioned by the present invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1, and CI Pigment Red 57:1.

Upon formulation above, the curable enamel composition is then applied to the desired substrate or article, e.g., steel, aluminum, or galvanized sheeting (either primed or unprimed), heated (i.e., cured) to a temperature of about 120° C. to about 175° C., for a time period of 5-60 minutes and subsequently allowed to cool. Thus, as a further aspect of the present invention, there is provided a shaped or formed article which has been coated with the thermosetting coating compositions of the present invention and cured.

Further examples of typical application and curing methods can be found in U.S. Pat. Nos. 4,737,551 and 4,698,391, incorporated herein by reference.

Example 1 describes the preparation of a phenol-functional polyester resin having the composition of NPG/TMP/IPA/AD/PHBA (PF-1).

EXAMPLE 1

Preparation of Phenol-Functional Polyester Resin (PF-1)

To a three-neck round bottom flask equipped with a mechanical stirrer, a steam partial-condenser, a Dean-Stark trap, and a water condenser were charged the following reactants: neopentyl glycol (NPG) 534.3 g (5.14 mole), trimethylolpropane (TMP) 291.5 g (2.18 mole), isophthalic acid (IPA) 863.0 g (5.20 mole), p-hydroxybenzoic acid(PHBA) 352.6 g (2.56 mole), a catalyst, FASCAT 4100 (Atochem) 1.9 g, and a color stabilizer, WESTON 618 (G.E. Specialty Chemicals), 3.8 g. The mixture was heated to 150° C. and stirred under a nitrogen atmosphere. The temperature was then gradually increased to 220° C. in a period of 3.5 hours and the distillate collected in the Dean-Stark trap. After stirring for four more hours, adipic acid (AD) 196.9 g (1.35 mole) was added. The reaction was complete after stirring for 4.5 more hours to give a resin with an ICI Cone and Plate viscosity of 39 poises at 175° C. Methyl n-amyl ketone (MAK) 836 g was then added to the mixture at 140° C. to yield a resin with about 70% solids. The properties of the neat resin are listed in Table I.

Example 2 describes the preparation of a phenol-functional polyester resin having the composition of NPG/TMP/CHDA/AD/PHBA (PF-2).

EXAMPLE 2

Preparation of Phenol-Functional Polyester Resin (PF-2)

To a three-neck round bottom flask equipped with a mechanical stirrer, a steam partial-condenser, a Dean-Stark trap, and a water condenser were charged the following reactants: TMP 291.5 g (2.18 mole), PHBA 352.6 g (2.56 mole), a catalyst, FASCAT 4100 1.9 g, and a color stabilizer, WESTON 618, 3.8 g. The mixture was heated to 150° C. and stirred under a nitrogen atmosphere. The temperature was then gradually increased to 200° C. over a period of 1.5 h and the distillate collected in the Dean-Stark trap. When the collection of the distillate stopped (2.5 more hours), indicating the first stage reaction was almost complete, NPG 534.3 g (5.14 mole), 1,4-cyclohexanedicarboxylic acid (CHDA) 893.4 g (5.19 mole), and AD 196.9 g (1.35 mole) were then added. The reaction was complete after stirring for 15 more hours to give a resin with an ICI Cone and Plate viscosity of 25 poises at 175° C. Xylene 851 g was then added to the mixture at 125° C. to yield a resin with about 70% solids. The properties of the neat resin are listed in Table I.

Example 3 describes the preparation of an acrylic resin with the composition of MMA/butylacrylate/styrene/HEMA.

EXAMPLE 3

Preparation of Acrylic Resin (A-1)

Into a 500 ml round-bottom flask equipped with a water condenser were charged with the following compounds: methyl methacrylate (MMA, 25 g), n-butyl acrylate (28 g), styrene (25 g), 2-hydroxyethyl methacrylate (HEMA, 19 g), and a solvent, methyl n-amyl ketone (MAK, 30 g). The mixture was then heated to about 120° C. and stirred under nitrogen atmosphere. A suspension of initiator, azobisisobutyronitrile (AIBN, 3.0 g), in MAK (18 g) was prepared. This initiator suspension was added sequentially to the reaction mixture every 0.5 h in three portions. The polymerization was complete after refluxing at 120° C. for four hours as evidenced by the 100 % conversion of the monomers to the polymer. The percent conversion was determined by evaporating a sample of the reaction mixture to figure out the percent non-volatiles. The properties of the neat resin are listed in Table I.

Example 4 describes the preparation of various enamels by blending the phenol-functional polyester resin (PF-1 or PF-2) with various acrylic resins (A-1 above or commercially-available acrylics—ACRYLOID AT-400 or ACRYLOID AU-608X from Rohm and Haas Company). ACRYLOID AT-400: 75% solids in MAK, hydroxyl number 67, acid number 18. ACRYLOID AT-608X: 60% solids in xylene, hydroxyl number 93.5.

EXAMPLE 4

Preparation of Enamels of Polyester and Acrylic Blends

Various resin blends (1–12 below) were prepared by mixing a PF polyester and an acrylic in a certain ratio so that the total weight of the resin blend (based on 100 solids) was 20 g. The resin solutions (e.g. 70 % solids) were used, but the ratio was calculated based on the neat resin (100 % solids) of polyester/acrylic by weight.

| Blend | Polyester | Acrylic | Ratio |
|-------|-----------|---------|-------|
| 1 | PF-1 | A-1 | 75/25 |
| 2 | PF-1 | A-1 | 50/50 |
| 3 | PF-1 | A-1 | 25/75 |
| 4 | PF-2 | A-1 | 75/25 |
| 5 | PF-2 | A-1 | 50/50 |
| 6 | PF-2 | A-1 | 25/75 |
| 7 | PF-1 | AT-400 | 75/25 |
| 8 | PF-1 | AT-400 | 50/50 |
| 9 | PF-1 | AT-400 | 25/75 |
| 10 | PF-2 | AU-608X | 75/25 |
| 11 | PF-2 | AU-608X | 50/50 |
| 12 | PF-2 | AU-608X | 25/75 |

Enamels were prepared typically by adding the following components to the above resin blends: CYMEL 303 (American Cyanamide Co.) 5.0 g, an acid catalyst, FLUORAD FC-430 (3M Co.) (20 % in isopropanol) 0.2 g, and a solvent blend, 20 g. The acid catalyst was NA-CURE 5076 (King Industries) 0.36 g, NACURE 5225 1.0 g, or pTSA 0.41 g (40 % in isopropanol). The solvent blend was methyl n-amyl ketone/xylene/EKTA-PRO EEP (Eastman Chemical Co.)=70/15/15 by weight. The mixtures were then shaken well to give clear solutions. Comparative enamels using only the acrylic resins were also prepared similarly as above.

EXAMPLE 5

Preparation of Coatings

Coatings were prepared by applying various enamels to cold-rolled steel test panels (ACT 3x9x032 from Advanced Coating Technologies) and baking in an oven at 120° or 175° C. for 30 minutes. The thickness of the coating films was about 1.0 to 1.5 mil. The properties of various resins and coatings are listed in Table I–V. Acid number and phenolic OH number were determined according to ASTM method D1639; the end points were determined by a potentiometric titration method. Molecular weights were estimated by gel permeation chromatography. Glass transition temperatures were recorded by a differential scanning calorimeter. Viscosities were measured by using an ICI Cone and Plate viscometer. Acid-etch resistance of the coatings was tested by adding a few drops of 10% sulfuric acid (e.g. six drops) onto the film surface of the coated panel and baking in an oven at 40° C., 50° C., or 60° C. for 0.5 hour. König pendulum hardness was measured by a pendulum hardness tester (BYK Gardner). Other coating tests were carried out according to the following standard methods:

1. Film Thickness (Fisher Deltascope MP 2)
2. Solvent Resistance (MEK Double Rub, ASTM D1308)
3. Gloss (BYK- micro-gloss, ASTM D523)
4. Pencil Hardness (ASTM D3362)
5. Impact Resistance (BYK- Gardner Impact Tester, ASTM D 2794)

TABLE I

| | Properties of Resins | | |
|---|---|---|---|
| | PF-1 | PF-2 | A-1 |
| Acid Number | 15 | 3 | 0 |
| Hydroxyl Number | 65 (phenolic) | 67 (phenolic) | 82 (aliphatic) |
| Mn | 2143 | 1854 | 1877 |
| Mw | 21635 | 12807 | 21523 |
| Tg | 43 | 25 | 47 |

Mn: number average molecular weight
Mw: weight average molecular weight
Tg: glass transition temperature

TABLE II

| | Coating Properties | | | |
|---|---|---|---|---|
| | Blend 1 | Blend 2 | Blend 3 | A-1 |
| MEK rubs | >200 | >200 | >200 | >200 |
| gloss (60°/20°) | 102/99 | 99/97 | 104/100 | 98/92 |
| pencil hardness | 4H | 4H | 4H | H |
| pendulum hardness (sec) | 187 | 177 | 169 | 157 |
| impact resistance dir./rev. (lb-in) | 40/<20 | 40/<20 | 20/<20 | 20/<20 |
| acid etch | | | | |
| 40° C. | 1 | 1 | 1 | 3 |
| 50° C. | 1 | 1 | 2 | 4 |

1: no effect, 2: slight loss of gloss, 3: partial loss of gloss, 4: complete loss of gloss
* cured at 130° C., 30 min
* catalyst: NACURE 5225

TABLE III

| | Coating Properties | | | |
|---|---|---|---|---|
| | Blend 4 | Blend 5 | Blend 6 | A-1 |
| MEK rubs | >200 | >200 | >200 | >200 |
| gloss (60°/20°) | 99/95 | 99/96 | 99/94 | 98/92 |
| pencil hardness | 4H | 4H | 4H | H |
| pendulum hardness (sec) | 173 | 172 | 171 | 157 |
| impact resistance dir./rev. (lb-in) | 160/160 | 60/20 | 40/20 | 20/<20 |
| acid etch | | | | |
| 40° C. | 1 | 1 | 1 | 3 |
| 50° C. | 3 | 3 | 3 | 4 |

1: no effect, 2: slight loss of gloss, 3: partial loss of gloss, 4: complete loss of gloss
* cured at 130° C., 30 min
* catalyst: NACURE 5225

TABLE IV

| | Coating Properties | | | |
|---|---|---|---|---|
| | Blend 7 | Blend 8 | Blend 9 | AT-400 |
| MEK rubs | >200 | >200 | >200 | >200 |
| gloss (60°/20°) | 101/99 | 102/100 | 101/99 | 97/87 |
| pencil hardness | 2H | H | H | H |
| impact resistance dir./rev. (lb-in) | 120/60 | 80/20 | 60/<20 | 40/<20 |
| acid etch | | | | |
| 50° C. | 1 | 2 | 2 | 3 |

TABLE IV-continued

| | Coating Properties | | | |
|---|---|---|---|---|
| | Blend 7 | Blend 8 | Blend 9 | AT-400 |
| 60° C. | 3 | 3 | 3 | 4 |

1: no effect, 2: slight loss of gloss, 3: partial loss of gloss, 4: complete loss of gloss
* cured at 130° C., 30 min
* catalyst: NACURE 5076

TABLE V

| | Coating Properties | | | |
|---|---|---|---|---|
| | Blend 10 | Blend 11 | Blend 12 | AU-608X |
| MEK rubs | >200 | >200 | >200 | >200 |
| gloss (60°/20°) | 94/84 | 94/90 | 96/81 | 92/81 |
| pencil hardness | 4H | 5H | 5H | 5H |
| impact resistance dir./rev. (lb-in) | 100/60 | 40/<20 | 20/<20 | 20/<20 |
| acid etch | | | | |
| 50° C. | 1 | 2 | 2 | 4 |

1: no effect, 2: slight loss of gloss, 3: partial loss of gloss, 4: complete loss of gloss
* cured at 175° C., 20 min
* catalyst: pTSA

I claim:

1. A thermosetting coating-composition comprising
   (I) about 5 to about 81 weight percent of a curable polyester having a number average molecular weight of about 800 to about 3500 and a weight average molecular weight of about 3000 to about 70,000, comprising
   (a) about 35 to 45 mole percent of diol residues,
   (b) about 4 to about 8 mole percent of triol residues,
   (c) about 5 to about 18 mole percent of residues of an aliphatic diacid,
   (d) about 0 to about 30 mole percent of an aromatic dicarboxylic acid residue other than terephthalic acid,
   (e) about 5 to about 35 mole percent of terephthalic acid residues, and
   (f) about 12 to about 20 mole percent of aromatic hydroxy acid residues,
   wherein all the stated mole percentages are based on the total moles of (a), (b), (c), (d), (e), and (f), with the total being 100 percent; and wherein substantially all of said aromatic hydroxy acid residues are located at the ends of the polymer chains to which they are attached;
   (II) about 5 to about 81 weight percent of an acrylic copolymer of ethylenically unsaturated monomers comprising at least one hydroxyl-functional monomer, said acrylic copolymer having a number average molecular weight of about 800 to about 10,000 and a weight average molecular weight of about 2,000 to 50,000; and
   (III) about 10 to about 50 weight percent of an amino crosslinker.

2. The composition of claim 1, wherein component (a) diol residues are selected from residues of

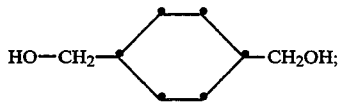

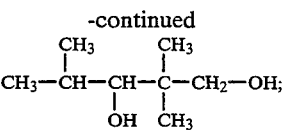

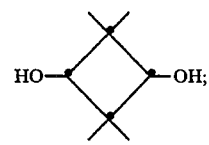

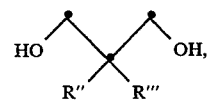

wherein R" and R''' are individually $C_1$-$C_8$ alkyl; and

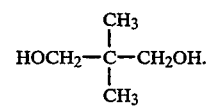

3. The composition of claim 1, wherein component (b) triol residues are selected from residues of trimethylolpropane, trimethylolethane, and glycerol.

4. The composition of claim 1, wherein the component (a) diol residues are comprised of a residue of the formula

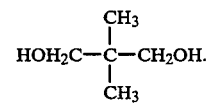

5. The composition of claim 1, wherein the component (b) triol residue consists essentially of trimethylolpropane residues.

6. The composition of claim 1, wherein the component (f) hydroxy acid residue is a residue of p-hydroxy benzoic acid.

7. The composition of claim 6, wherein the component (a) diol residues are comprised of a residue of the formula

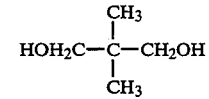

component (b) triol residues are comprised of trimethylolpropane residues;
component (c) aliphatic diacid residues are comprised of adipic acid residues;
component (d) aromatic diacid residues are comprised of isophthalic acid residues; and
component (f) hydroxy acid residues are comprised of residues of

8. The composition of claim 1, wherein component (II) has a hydroxyl number of about 50 to about 120 mg KOH/g.

9. The composition of claim 1, wherein the ethylenically unsaturated monomers for synthesizing the acrylic copolymer of component (II) are selected from the group consisting of acrylate, methacrylate, styrene, (meth)acrylic acid, and vinyl esters; optionally substituted by a group selected from the group consisting of hydroxyl, epoxy, carboxyl, blocked phenol, and acetoxyacetyl.

10. A shaped or formed article coated with the cured composition of claim 1.

11. A thermosetting coating composition comprising
(I) about 5 to about 81 weight percent of a curable polyester having a number average molecular weight of about 1500 to about 3500 and a weight average molecular weight of about 10,000 to about 70,000, comprising
 (a) about 20 to 36 mole percent of diol residues,
 (b) about 10 to about 21 mole percent of triol residues,
 (c) about 5 to about 18 mole percent of residues of an aliphatic diacid,
 (d) about 25 to about 35 mole percent of aromatic dicarboxylic acid residues,
 (e) about 12 to about 20 mole percent of aromatic hydroxy acid residues,
wherein all the stated mole percentages are based on the total mole of (a), (b), (c), (d), and (e), with the total being 100 percent; and wherein substantially all of said aromatic hydroxy acid residues are located at the ends of the polymer chains to which they are attached;
(II) about 5 to about 81 weight percent of an acrylic copolymer of ethylenically unsaturated monomers comprising at least one hydroxyl-functional monomer, said acrylic copolymer having a number average molecular weight of about 800 to about 10,000 and a weight average molecular weight of about 2,000 to 50,000; and
(III) about 10 to about 50 weight percent of an amino crosslinker.

12. The compositon of claim 11, wherein component (a) diol residues are selected from residues of

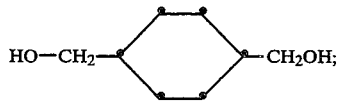

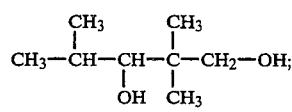

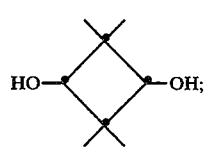

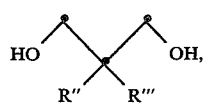

wherein R" and R''' are individually $C_1$-$C_8$ alkyl; and

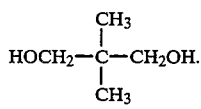

13. The composition of claim 11, wherein component (b) triol residues are selected from residues of trimethylolpropane, trimethylolethane, and glycerol.

14. The composition of claim 11, wherein the component (a) diol residues are comprised of a residue of the formula

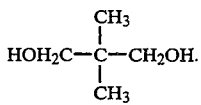

15. The composition of claim 11, wherein the component (b) triol residue consists essentially of trimethylolpropane residues.

16. The composition of claim 11, wherein the component (e) hydroxy acid residue is a residue of p-hydroxy benzoic acid.

17. The composition of claim 11, wherein the component (d) aromatic diacid residue is comprised of isophthalic acid residues.

18. The composition of claim 11, wherein the component (a) diol residues are comprised of a residue of the formula

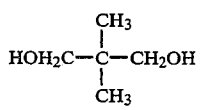

component (b) triol residues are comprised of trimethylolpropane residues;
component (c) aliphatic diacid residues are comprised of adipic acid residues;
component (d) aromatic diacid residues are comprised of isophthalic acid residues; and
component (e) hydroxy acid residues are comprised of residues of

19. The composition of claim 11, wherein the ethylenically unsaturated monomers for synthesizing the acrylic copolymer of component (II) are selected from the group consisting of acrylate, methacrylate, styrene, (meth)acrylic acid, and vinyl esters; optionally substituted by a group selected from the group consisting of hydroxyl, epoxy, carboxyl, blocked phenol, and acetoxyacetyl.

20. A shaped or formed article coated with the cured composition of claim 11.

21. A thermosetting coating composition comprising
(I) about 5 to about 81 weight percent of a curable polyester having a number average molecular weight of about 800 to about 3000 and a weight average molecular weight of about 3,000 to about 40,000, comprising (a) about 35 to 45 mole percent of diol residues,
(b) about 4 to about 8 mole percent of triol residues,
(c) about 0 to about 16 mole percent of residues of a linear aliphatic diacid,
(d) about 24 to about 40 mole percent of 1,3-and/or 1,4-cyclohexanedicarboxylic acid residues,
(e) about 12 to about 20 mole percent of aromatic hydroxy acid residues, wherein all the stated mole percentages are based on the total mole of (a), (b), (c), (d), and (e), with the total being 100 percent; and wherein substantially all of said aromatic hydroxy acid residues are located at the ends of the polymer chains to which they are attached;

(II) about 5 to about 81 weight percent of an acrylic copolymer of ethylenically unsaturated monomers comprising at least one hydroxyl-functional monomer, said acrylic copolymer having a number average molecular weight of about 800 to about 10,000 and a weight average molecular weight of about 2,000 to 50,000; and (III) about 10 to about 50 weight percent of an amino crosslinker.

22. The composition of claim 21, wherein component (a) diol residues are selected from residues of

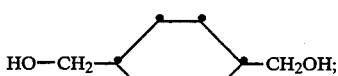

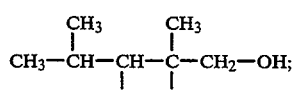

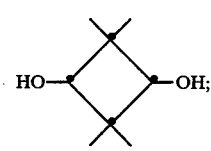

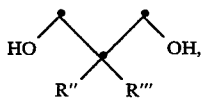

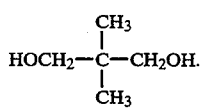

wherein R" and R"' are individually $C_1$-$C_8$ alkyl; and

23. The composition of claim 21, wherein component (b) triol residues are selected from residues of trimethylolpropane, trimethylolethane, and glycerol.

24. The composition of claim 21, wherein the component (a) diol residues are comprised of a residue of the formula

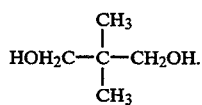

25. The composition of claim 21, wherein the component (b) triol residue consists essentially of trimethylolpropane residues.

26. The composition of claim 21, wherein the component (e) hydroxy acid residue is a residue of p-hydroxy benzoic acid.

27. The composition of claim 21, wherein the component (a) diol residues are comprised of a residue of the formula

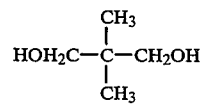

component (b) triol residues are comprised of trimethylolpropane residues;
component (c) aliphatic diacid residues are comprised of adipic acid residues; and
component (e) hydroxy acid residues are comprised of residues of

28. The composition of claim 21, wherein the ethylenically unsaturated monomers for synthesizing the acrylic copolymer of component (II) are selected from the group consisting of acrylate, methacrylate, styrene, (meth)acrylic acid, and vinyl esters; optionally substituted by a group selected from the group consisting of hydroxyl, epoxy, carboxyl, blocked phenol, and acetoxyacetyl.

29. A shaped or formed article coated with the cured composition of claim 21.

30. A thermosetting coating composition comprising
(I) about 5 to about 81 weight percent of a curable polyester having a number average molecular weight of about 1500 to about 3000 and a weight average molecular weight of about 5,000 to about 40,000, comprising
(a) about 20 to 36 mole percent of diol residues,
(b) about 10 to about 21 mole percent of triol residues,
(c) about 0 to about 16 mole percent of residues of a linear aliphatic diacid,
(d) about 24 to about 40 mole percent of cyclohexanedicarboxylic acid residues,
(e) about 12 to about 20 mole percent of aromatic hydroxy acid residues, wherein all the stated mole percentages are based on the total mole of (a), (b), (c), (d), and (e), with the total being 100 percent; and wherein substantially all of said aromatic hydroxy acid residues are located at the ends of the polymer chains to which they are attached;

(II) about 5 to about 81 weight percent of an acrylic copolymer of ethylenically unsaturated monomers comprising at least one hydroxyl-functional monomer, said acrylic copolymer having a number average molecular weight of about 800 to about 10,000 and a weight average molecular weight of about 2,000 to 50,000; and (III) about 10 to about 50 weight percent of an amino crosslinker.

31. The composition of claim 30, wherein component (a) diol residues are selected from residues of

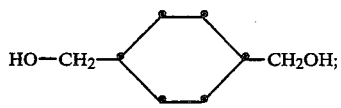

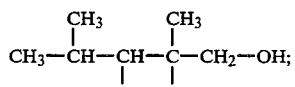

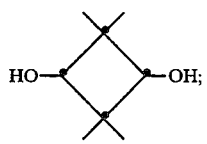

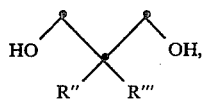

wherein R″ and R‴ are individually $C_1$–$C_8$ alkyl; and

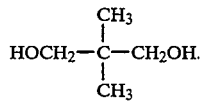

32. The composition of claim 30, wherein component (b) triol residues are selected from residues of trimethylolpropane, trimethylolethane, and glycerol.

33. The composition of claim 30, wherein the component (a) diol residues are comprised of a residue of the formula

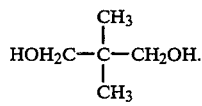

34. The composition of claim 30, wherein the component (b) triol residue consists essentially of trimethylolpropane residues.

35. The composition of claim 30, wherein the component (e) hydroxy acid residue is a residue of p-hydroxy benzoic acid.

36. The composition of claim 30, wherein the component (a) diol residues are comprised of a residue of the formula

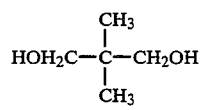

component (b) triol residues are comprised of trimethylolpropane residues;

component (c) aliphatic diacid residues are comprised of adipic acid residues; and component (e) hydroxy acid residues are comprised of residues of

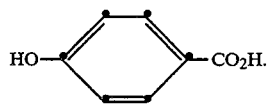

37. A shaped or formed article coated with the cured composition of claim 30.

* * * * *